United States Patent [19]
Jones, Jr.

[11] 3,760,189
[45] Sept. 18, 1973

[54] MOTION DETECTING APPARATUS

[75] Inventor: Clarence O. Jones, Jr., Eggertsville, N.Y.

[73] Assignee: Niagara Machine & Tool Works, Buffalo, N.Y.

[22] Filed: Oct. 10, 1972

[21] Appl. No.: 296,102

[52] U.S. Cl. .................... 307/120, 340/271, 73/509
[51] Int. Cl. ........................................... H01h 35/06
[58] Field of Search ................... 307/120, 122, 119, 307/152, 106; 340/263, 271, 267; 73/488, 507, 509

[56] References Cited
UNITED STATES PATENTS
3,261,007  7/1966  Frisch ............................ 340/271 X
3,559,205  1/1971  Colby ............................ 340/271 X Primary Examiner—Herman J. Hohauser
Attorney—Conrad Christel et al.

[57] ABSTRACT

Detecting apparatus for providing a signal when a rotating machine element stops and comprising a pulse generating means mechanically coupled to the machine element for producing electrical pulses at a frequency directly proportional to the speed of rotation of the element. The pulses are applied through a pulse shaper to signal generating means for producing, in response to the occurrence of each pulse, first and second signals which decrease and increase, respectively, in a regular and continuous, preferably linear, manner until the next pulse occurs whereupon the signals are repeated. The signals are applied to a comparison circuit which provides an indicating signal in response to a predetermined relationship between the first and second signals indicating that the machine element has stopped rotating, and the indicating signal is used to control the machine. In preferred form, the element is a cam fixed to the shaft of rotary switching apparatus which is coupled to the drive shaft of a machine such as a power press and which controls the machine.

8 Claims, 5 Drawing Figures

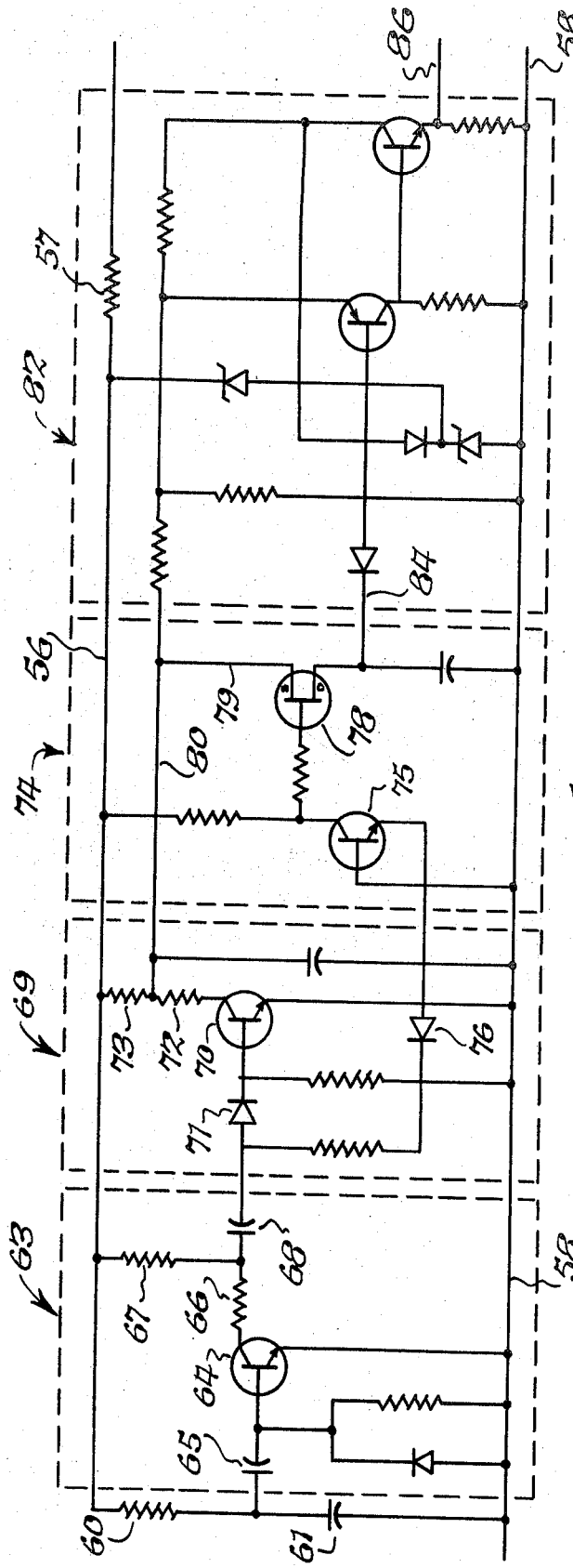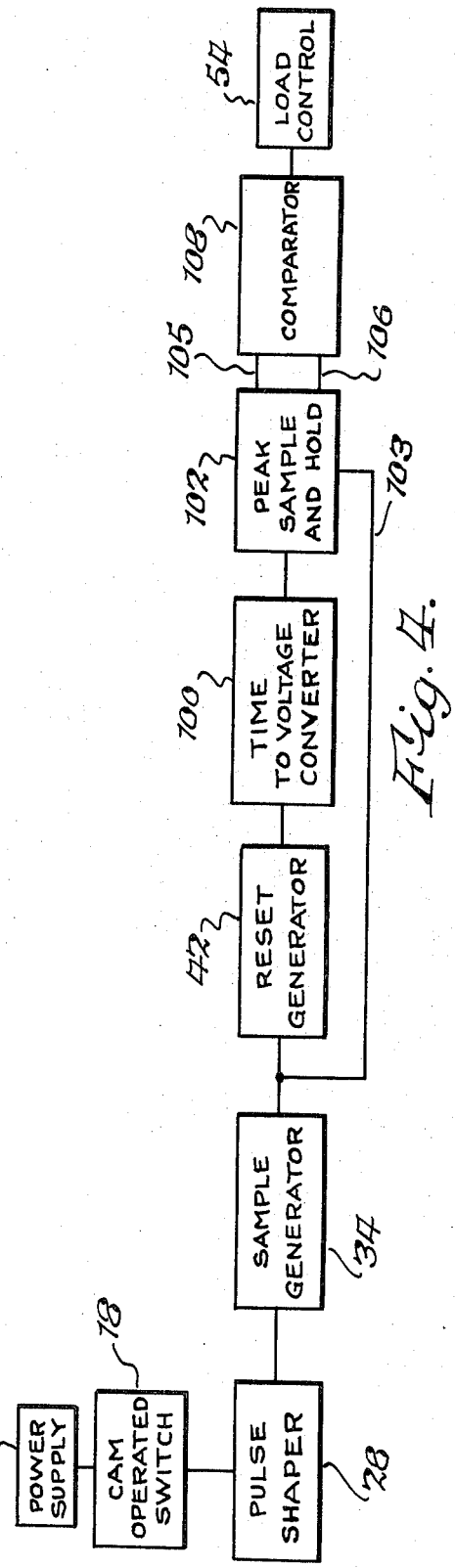

MOTION DETECTING APPARATUS

BACKGROUND OF THE INVENTION

This invention relates to apparatus for monitoring the operation of a rotating machine element, and more particularly to electric circuit means for detecting when the rotating machine element stops.

A common area of use of the apparatus of the present invention is in the machine control art wherein rotary motion derived from the machine drive shaft is used to operate rotary switching apparatus. The switching apparatus, in conjunction with electrical circuits, can control the time in the operating cycle and hence the position at which a machine component is stopped as well as the time when the component is again put in motion. A particular example of such a machine is a power press wherein the slide or ram is caused to move back and forth between a workpiece and a controlled top stop position for each complete rotation of the press drive shaft. By way of illustration the present invention will be described with particular reference to such machines, although the principles of the invention may be variously applied.

The machine drive shaft is coupled to rotary switching apparatus by a chain, separate shaft, right angle gearing or other suitable coupling means, and these coupling means are susceptible to malfunction or failure such as loosening or breaking of the chain. It therefore becomes important to monitor the operation of such machine control switches to detect failure or abnormal operation of the switch drive and to stop the machine in response to the same, particularly in the case of a power press. Prior art apparatus purporting to solve this problem monitors the operation of the drive coupling to the switch. It would be highly desirable to provide apparatus for monitoring the operation of the rotary switch itself which is the real item of interest, especially in the control of a machine such as a power press. Also, it is important that such monitoring apparatus be capable of operating under conditions of variable machine drive speeds without giving any false signals. Furthermore, such monitoring apparatus should be effective and reliable in operation and reliable in operation and relatively simple and economical in construction.

SUMMARY OF THE INVENTION

The present invention provides apparatus for detecting that a rotating machine element has stopped and comprising pulse generating means mechanically coupled to the machine element for producing electrical pulses at a frequency directly proportional to the speed of rotation of the machine element. Each pulse is utilized to generate two signals each of which varies with time in a regular manner. The two signals are compared constantly, and this comparison provides a signal when a pulse does not appear because of the fact that the machine element has stopped or effectively stopped rotating. This signal is used for control purposes such as stopping the machine.

While a single specific embodiment of the principles of the present invention is illustrated in the accompanying drawing and described in detail in the following specification, it is to be understood that such embodiment is by way of example only and that various mechanical modifications may be made without departing froom the spirit of the invention, the scope of which is limited only as defined in the appended claims.

BRIEF DESCRIPTION OF THE DRAWINGS

FIG. 3 is a schematic circuit diagram of one form of electrical circuit which can be included in the apparatus of FIG. 1;

FIG. 4 is a block diagram of another electrical circuit which can be included in the apparatus of FIG. 1.

DETAILED DESCRIPTION OF THE PREFERRED EMODIMENT

Figure 1:
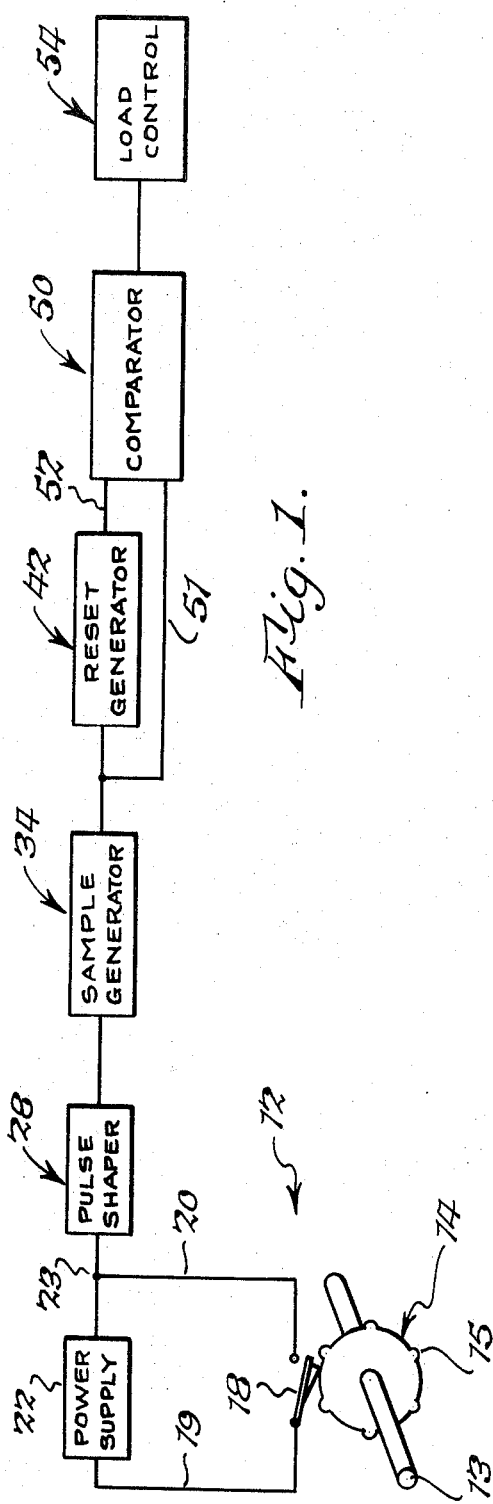
FIG. 1 is a schematic block diagram, partly diagrammatic, of apparatus according to the present invention for detecting and signalling that a rotating machine element has stopped.

FIG. 1 is a block diagram of apparatus according to the present invention for detecting when a rotating machine element stops and more particularly for signaling a malfunction of failure in the drive to rotary switching apparatus wherein rotary motion is derived from the drive shaft of a machine controlled by the switch. One form of rotary switching apparatus to which the invention is particularly applicable is shown in U.S. Pat. No. 3,510,610 issued May 5, 1970 and assigned to the same assignee of the present invention. In the switching apparatus of that patent, briefly, electrical switches attached to a housing are periodically opened and closed by corresponding cams positioned on a shaft rotatably connected in the housing. The shaft is coupled through suitable means to a machine drive shaft, such as the drive shaft of a power press, and the cam-operated switches are electrically connected in the press control circuits.

The apparatus of the present invention comprises pulse generating means, generally designated 12 in FIG. 1, mechanically coupled to a rotating machine element for producing electrical pulses directly proprotional to the speed of rotation of the machine element. In the present instance the machine element comprises a shaft 13 having a cam 14 fixed thereon and provided with a plurality of lobes or rise portions 15 located at regular or equal intervals around the circumference thereof. While the particular number of equally-spaced cam lobes may vary depending upon the nature of use of the present invention, in the present example of controlling a power press, six lobes 15 spaced at 60 degree angular intervals around the axis of shaft 13 is preferred. A normally-open switch 18 is positioned in proximity to cam 14 so as to be closed by cam lobes 15 coming in contact therewith, whereby switch 18 is opened and closed periodically at the rate of six times, i.e. six openings and six closings, for each rotation of shaft 13. Switch 18 is connected by lines 19, 20 in an electrical circuit with a conventional electrical power source designated 22. Therefore, in response to rotation of shaft 13 pulse generating means 12 produces electrical pulses at the output 23 thereof having a frequency directly proportional to the speed of rotation of shaft 13, and hence of cam 14, which pulses are graphically represented by the waveform 24 shown in FIG. 2. As long as shaft 13 is rotated by the machine, pulses 24 will be produced. Line 25 indicates the zero or reference level for pulse waveform 24, and the width or time duration of the pulses 24 is a function of the mechanical characteristics of switch 18 and of the shape and size of cam lobes 15.

Figure 2:
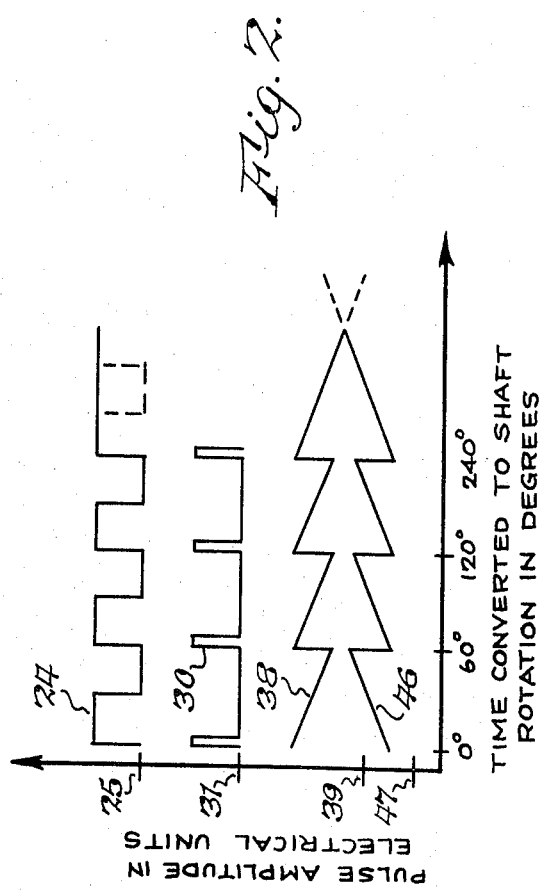
FIG. 2 is a graph illustrating electrical signal waveforms present at various locations in the apparatus of FIG. 1.

The pulses 24 are applied to the input of a pulse shaping means 28 wherein the pulses are converted to sharp, relatively narrower pulses having the same frequency as pulses 24 and illustrated by waveform 30 in FIG. 2. The purpose of this conversion is for more efficient and effective electronic processing. Pulse shaping means 28 is representative of various types of pulse shaping circuits well known to those skilled in the art so that a detailed description thereof is believed to be unnecessary. Suffice it to say, pulse shaping means 28 is triggered or activated in response to the leading edge of each pulse 24 for providing a pulse 30 which is relatively sharp, narrow in width, and which occurs at a time corresponding to that of the leading edge of pulse 24. An illustrative form of pulse shaping means 28 will be shown in detail further on in the specification. Pulses 30 which appear at the output of shaping means 28 therefore have a frequency directly proportional to the speed of rotation of shaft 13 and cam 14.

The apparatus according to the present invention further comprises signal generating means coupled to pulse generating means 12 for producing, in response to each pulse, first and second signals each of which varies with time in a regular, continuous manner. The variations of the first and second signals are different relative to each other but there is a relationship between the two signals which is readily comparable. Each signal continues to vary until the next pulse 24 occurs whereupon the signals are repeated and again vary in the same manner as before. In particular, a sample signal generator 34 is connected to the output of pulse shaping means 28 and generates a signal only in response to the presence of a pulse. The signal generated by means 34 has a starting or initial value and changes with time in a regular and continuous manner whereupon in response to the occurrence of the next pulse 24, the signal returns to the same starting point instantaneously and begins to vary again in the same manner. In preferred form the signal generated by means 34 starts at a predetermined level and then decreases in amplitude linearly with time in response to the occurrence of a pulse 24 whereupon in response to the occurrence of the next pulse 24 the signal generated by means 34 rises instantaneously to the initial or maximum amplitude and then again begins to decrease linearly therefrom. This signal thus comprises successive, adjacent ramp signals which combine to form a sawtooth-like waveform designated 38 in FIG. 2. The reference amplitude level for waveform 38 is indicated by line 39 intersecting the vertical axis of the graph in FIG. 2.

The signal generating means further comprises a reset signal generator 42 connected to sample signal generator 34. Signal generator 42 functions like signal generator 34 to produce, in response to the occurrence of a pulse 24, a signal which has a starting or initial value and changes with time in a regular and continuous manner whereupon in response to the occurrence of the next pulse 24, the signal returns to the same starting point instantaneously and begins to vary again in the same manner. In preferred form the signal generated by means 42 starts at a predetermined level and then increases in amplitude linearly with time in response to the occurrence of a pulse 24 whereupon in response to the occurrence of the next pulse 24 the signal generated by means 42 falls instantaneously to the initial or minimum amplitude and then again begins to increase linearly therefrom. The signal provided by generator 42 thus differs from the signal provided by generator 34 but there is a readily comparable relationship between the two signals. This signal likewise comprises successive, adjacent ramp signals which combine to form a sawtooth-like waveform designated 46 in FIG. 2. The reference or zero level for waveform 46 is indicated by line 47 intersecting the vertical axis of the graph in FIG. 2.

Apparatus of the present invention further comprises comparison means connected to the signal generating means for providing an indicating signal in response to the occurrence of a predtermined relationship between the first and second signals indicating that the machine element has stopped rotating. In particular, there is provided a comparator circuit 48 one input of which is connected by line 51 to the output of sample signal generator 34 and the other input of which is connected by line 52 to the output of reset signal generator 42. The output of comparator circuit 48 is connected to a control 54. Comparator circuit 50 functions, briefly, to provide an output signal only when a predetermined relationship exists between the signals appearing on lines 51, 52. In the present example comparator circuit 40 will provide an output signal when the signals on lines 51 and 52 are coincident, that is when the difference between the two signals is zero. When the apparatus of the present invention is used in conjunction with a machine such as a power press, an output signal from cpmparator 50 is utilized to operate a relay in an emergency stop circuit of the machine control.

The apparatus of the present invention operates in the following manner. When the apparatus is used in the control of a machine such as a power press, cam 14 is installed on the shaft of a rotary limit switch such as that described in the aforementioned U.S. Pat. No. 3,510,610 and shaft 13 shown in FIG. 1 therefore represents the shaft in the rotary switch of that patent. For example, switch 18 in FIG. 1 can comprise one camoperated switch of the rotary switch in which case the corresponding cam would be replaced by cam 14, or alternatively cam 14 and switch 18 can be installed separately on the shaft and housing, respectively, of the rotary switching apparatus of that patent. The switch shaft, i.e. shaft 13 of FIG. 1, is coupled to the machine or press drive shaft by suitable means such as a chain and sprocket coupling. Cam 14 has six lobes or rise portions 15 spaced at 60 degree angular intervals around the periphery thereof so that six pulses are produced for every rotation of shaft 13. The leading edges of the pulses 24 occur at the time when shaft 13 rotates through the zero, sixty, 120, etc. degree angular intervals. The frequency of pulses 24 is directly proportional to the speed of rotation of shaft 13, and so long as shaft 13 is rotated by the machine pulses 24 continue to be produced. In other words, as long as shaft 13 does not stop rotating, the next pulse in the train of pulses 24 will occur at its expected point in time.

The pulses 24 are converted to the relatively narrower, sharp pulses 30 which, in turn, are applied to the input of sample signal generator 34. Generator 34 produces waveform 38 which varies regularly and repetitively in the manner illustrated in FIG. 2 so long as pulses 24 continue to be produced. Similarly generator 42 produces waveform 46 which varies regularly and repetitively as shown in FIG. 2 so long as pulses 24 continue to be produced. In particular, the two signals produced by signal generating means 34 and 42 decrease and increase, respectively, with time in a linear manner toward the same level of magnitude and in a manner whereby the signals do not coincide if the next pulse 24 appears at its regular time. In the present example, pulses 24 appear at the zero, 60°, 120° and 240° rotary positions of shaft 13. In other words, shaft 13 continues to rotate through 240 degrees in the present example. Then, however, shaft 13 stops rotating, for example due to a failure in the coupling between the machine drive shaft and the switch shaft 13. As a result, the next pulse does not appear at its regularly scheduled or expected time. As shown in FIG. 2, waveforms 38 and 46 continue to vary in their regular, linear manner and do not return to their respective initial values. At a short period of time after the time at which the next pulse normally would have occurred at the 360 degree rotational position of shaft 13, waveforms 38 and 46 coincide whereupon comparator 50 senses this and provides an output signal indicating that shaft 13 has stopped rotating. This in turn would cause immediate shutdown of the machine or press. In particular, an output signal from comparator 50 causes energization of a relay controlling switch contacts in the emergency stop circuit of the power press control.

The apparatus of the present invention advantageously monitors the actual machine element of interest, for example the rotation of the shaft and cam of a rotary limit switch, thereby providing a truly accurate and dependable indication of a fault or malfunction in the machine element or in the coupling of the mechanical drive thereto. When applied to rotary switching apparatus controlling the operation of a machine such as a power press, the present invention uses a cam of the switch to produce a signal which is dependent on the speed of the machine or press. The apparatus advantageously samples every pulse and it is designed so that if the next pulse does not appear at its proper or regularly expected time, a malfunction or fault will be signaled. The generation, in response to the occurrence of each pulse, of first and second signals each varying with time in a regular, continuous manner until the next pulse occurs whereupon the signals are repeated and again vary in the same manner as before, together with the constant comparing of the two signals to provide an indicating signal in response to the occurrence of the predetermined relationship between the signals indicative that rotation of the machine element has ceased, provides monitoring apparatus which is relatively simple in construction yet highly effective and accurate in operation. The foregoing together with the fact that a plurality of pulses, in the present instance six, are generated during each rotation of the machine element enables an abnormal condition to be detected and signalled extremely quickly, within a fraction of the time required for one rotation of the machine drive shaft, which is highly desirable for reasons of safety in machines such as a power press. In addition, the circuit provides a signal only when the machine element stops rotating and therefore is compatible with machines driven at variable speeds during operation. Thus the machine speed can vary and the monitoring apparatus of the present invention will follow this variation, providing a signal only when the machine element stops rotating. Therefore the apparatus requires no adjustment when the operating speed of the machine is to be changed.

Referring again to FIG. 2, it will be noted that the waveforms 38 and 46 intersect or coincide at a point in time slightly after the time at which a missing pulse is detected. In particular, the time of coincidence of the signals occurs a short period of time after the time when the leading edge of the next pulse would have been present, the time period being less than the duration of each pulse 24. This is designed into the circuitry of the apparatus to provide a predetermined measure of tolerance for slight variations in the duty cycle of pulses 24 and for slight slippages of the chain and sprocket drive between the machine or press drive shaft and the shaft of the switching apparatus. Furthermore, there may be some lower limit on the speed of rotation of shaft 13, for example 10 r.p.m., below which the circuit of the present invention functions as if shaft 13 were completely stopped. The particular speed limit will of course depend on the nature of the circuit. Thus, in defining the present invention the term stopped is intended to include both a complete stopping of the machine element and an effective stopping thereof where the speed falls below the lower limit established by the circuitry.

FIG. 3 illustrates one form of electrical circuit which can be utilized in the system of FIG. 1. In the circuit of FIG. 3 a line 56 is connected through a resistor 57 to a source of positive bias voltage (not shown), and a line 58 is connected at zero or reference voltage potential. The pulses 24 generated in response to rotation of cam 14 by shaft 13 are applied through a filter comprising a resistor 60 and capacitor 61 to the input of an a.c. coupled switch circuit 63. Circuit 63 includes a transistor switch 64, the emitter terminal of which is connected to line 58 and the base terminal of which is coupled through a capacitor 65 to the junction of capacitor 61 and resistor 60. The parallel combination of a diode and resistor are connected between the base of transistor 64 and line 58. The collector of transistor 64 is connected through resistors 66, 67 to line 56. A capacitor 68 couples the output of circuit 63 from the junction of resistors 66, 67 to the input of a ramp generator and clamp circuit 69. The voltage waveform appearing at the base of transistor 64 has a small negative level when no pulse 24 is present, increases instantaneously to a small positive level sufficient to turn on transistor 64 when a pulse 24 appears, decreases exponentially to zero before pulse 24 disappears, and then changes instantaneously to the negative level when pulse 24 disappears. Initially the voltage at the junction of resistors 66, 67 is near the voltage on line 56, but when transistor 64 is turned on the voltage at this junction changes instantaneously to zero. It remains at this level until transistor 64 is turned off whereupon the voltage returns to the initial level. The ramp generator and clamp circuit 69 of FIG. 3 includes a transistor 70, the emitter of which is connected to line 58 and the base of which is connected to the cathode of a diode 71, the anode of which is connected to capacitor 68. The base terminal of transistor 70 also is connected through a resistor to line 58. The collector terminal of transistor 70 is connected through resistors 72, 73 to bias line 56, and the junction of resistors 72, 73 is connected through a capacitor to reference potential line 58. The waveform appearing at the junction of resistors 72, 73 grows from a zero or reference voltage level exponentially to a level approaching the value of the bias voltage on line 56 whereupon at the beginning of a pulse 24 the waveform decreases instantaneously to the zero or reference level and remains at that level for the duration of the pulse 24. When the pulse disappears, the waveform again grows exponentially to its peak value.

The signal at the junction of resistors 72, 73 is applied to a sample and hold circuit 74 including a transistor 75, the emitter of which is connected to the anode of a diode 76, the cathode of which is connected through a resistor to a point common to the anode of diode 71 in circuit 69 and capacitor 68. The base terminal of transistor 75 is connected to line 58, and the collector terminal thereof is connected through a resistor to the control or gate terminal of a field effect transistor 78 the source terminal of which is connected by lines 79, 80 to the junction of resistors 72, 73. The waveform apearing at the collector of transistor 75 is a square wave which duplicates the waveform defined by pulses 24. The waveform appearing at the drain terminal of transistor 78 is a sawtooth waveform having a maximum amplitude corresponding in time to the leading edge of a pulse 24 and which decreases linearly in a regular manner until the next pulse 24 appears whereupon it instantaneously rises to the maximum value.

The junction of resistors 72, 73 is connected by line 80 to one input of a comparator circuit 82, the other input of which is connected by a line 84 to the drain terminal of transistor 78. Comparator circuit 82 provides an output signal on a line 86 only when there exists a predetermined relationship between the two signals applied to the inputs of circuit 82. Line 86 can be connected to the base terminal of a transistor, the emitter terminal of which is connected to line 58 and the collector terminal of which is connected to the control or gate terminal of a semiconductor controlled rectifier such as a Triac. The controlled rectifier, in turn, can be connected between line 58 and a circuit for energizing a relay for controlling the operation of the machine such as causing emergency stopping of a power press.

Figure 5:
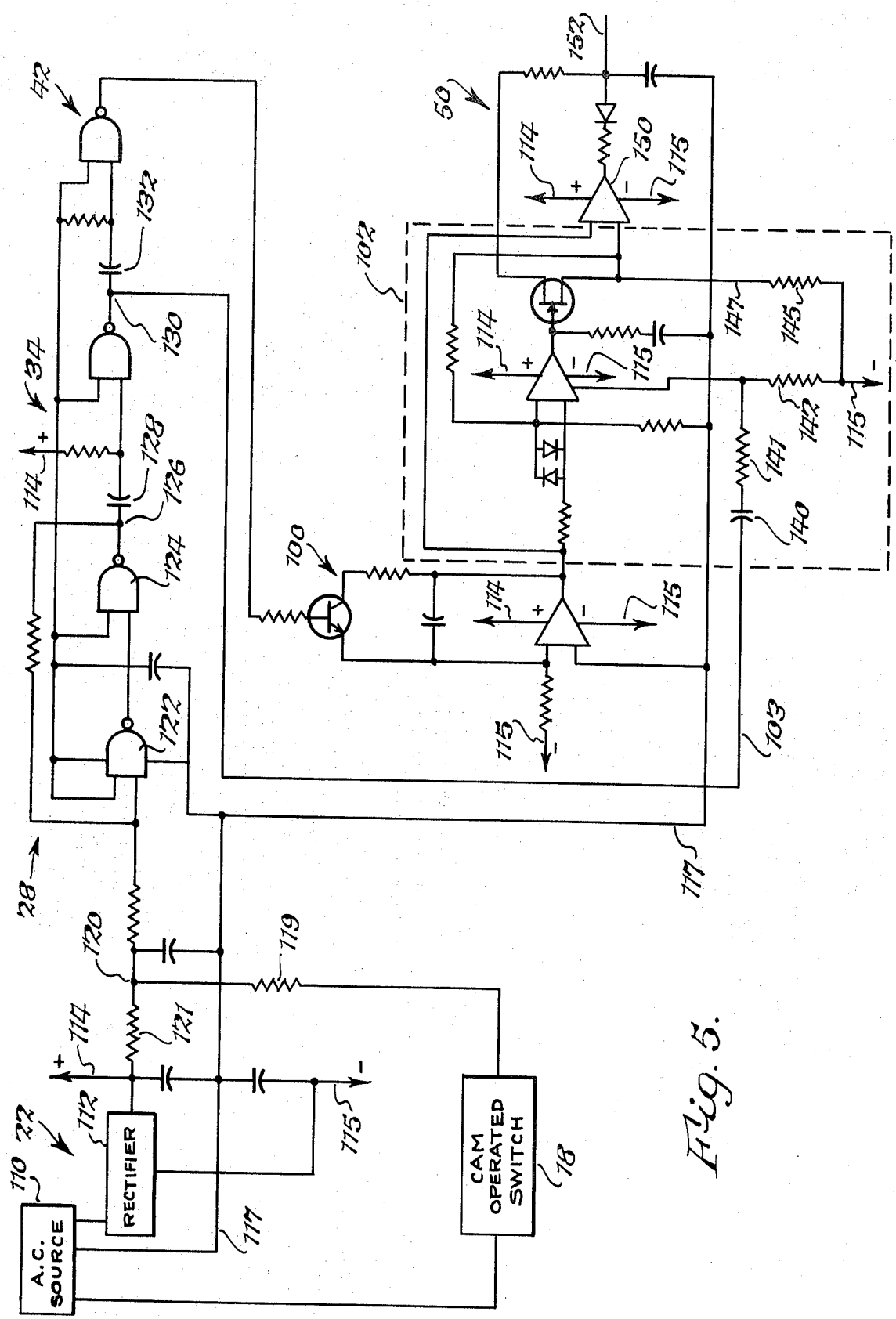
FIG. 5 is a schematic diagram of the circuit of FIG. 4.

FIGS. 4 and 5 illustrate an alternative form of electrical circuit which can be employed in the system of the present invention. Portions of the system of FIG. 4 are similar to the system of FIG. 1 and, in particular, a power supply 22 is connected through cam-operated switch 18 to the input of a pulse shaping circuit 28, the output of which is connected to the input of sample signal generator 34. The output of generator 34 is applied to the input of reset signal generator 42, the output of which is coupled through a time-to-voltage converter circuit 100 to one input of a peak sample and hold circuit 102. The output of sample signal generator 34 also is connected by a line 103 to the other input of circuit 102. Two signals present on lines 105, 106 are applied to a comparator circuit 108, the output of which is connected to load control circuit 54.

FIG. 5 is a schematic circuit diagram illustrating portions of the system of FIG. 4 in further detail. Power supply 22 comprises the combination of an a.c. source 110 including a conventional transformer and a rectifier 112. Positive and negative bias voltages, for example about 14 volts positive and about 14 volts negative are present on lines 114 and 115, respectively connected to the output of rectifier 112, and for convenience in illustration the connections of lines 114 and 115 to appropriate locations in the circuit of FIG. 5 are shown fragmentarily. A line 117 comprises a reference potential line for the circuit of FIG. 5 and is connected to a center tap on the secondary winding of the transformer includes in source 110. Cam operated switch 118 in the present example is connected between a resistor 119 and the common or reference end of the primary winding of the transformer of source 110. As a result, pulses similar to those designated 24 in FIG. 2 appear at the junction 120 between resistor 119 and a resistor 121. The pulses are applied to the input of pulse shaper 28 which in the present illustration comprises a Schmitt trigger circuit. The Schmitt trigger circuit includes a pair of AND gates 122 and 124, and the circle present at the output end of each gate means that the signal produced thereby is relatively negative when it represents a logical one. In other words, when there are two relatively positive signals present at the input of the gate, a relatively negative signal is produced at the output, and at all other times a relatively positive level is present at the output. Pulses similar to those designated 30 in FIG. 2 are present at the output 126 of wave shaping circuit 28, and these pulses are coupled through a capacitor 128 to the input of sample signal generator 34. In response to the presence of each pulse 24, there appears at the output 130 of sample signal generator 34 a signal which varies in a regular, continuous manner, similar to that of the signal 38 shown in FIG. 2, until the next pulse 24 occurs whereupon the signal is repeated and again varies in the same manner as before.

The output of sample signal generator 34 is coupled through a capacitor 132 to the input of a reset signal generator 42, and the signal produced by generator by generator 42 varies in a regular, continuous manner similar to that of the signal 46 shown in FIG. 2 until the next pulse 24 occurs whereupon the signal is repeated. The signal provided by generator 42 differs from that provided by generator 34 but in a manner whereby there exists readily comparable relationship between the two signals. The output of reset signal generator 42 is connected to the input of time-to-voltage converter circuit 100 for converting signal variations functionally related to time to corresponding variations in voltage. The output of converter circuit 100 is applied to the input of peak sample and hold circuit 102. Output 130 of sample signal generator 34 is connected by line 103 to a portion of circuit 102 including a capacitor 140 and network of resistors 141, and 142 and this portion is connected through a resistor 145 and by a line 147 to one input of comparator circuit 50 including an operational amplifier 150. The other input of comparator circuit 50 is connected to another portion of sample and hold circuit 102. Comparator circuit 50 produces an output signal on a line 152 only when there exists a predetermined relationship between the two input signals applied to operational amplifier 150.

The output of comparator circuit 50, present on line 152, is connected to a load control circuit designated 54 in FIG. 4, which can include a controlled rectifier such as a Triac, the control or gate terminal of which would be coupled through a suitable driving circuit to line 152, and which controlled rectifier would be connected in series between the control winding of a relay and the power supply 22. The relay, in turn, controls switch contacts in a machine control circuit such as the emergency stop circuit of a power press control.

I claim:

1. In combination with a machine having an element which is rotated during operation of said machine, means for detecting when said rotating element stops comprising:
   a. pulse generating means mechanically coupled to said element for producing electrical pulses at a frequency directly proportional to the speed of rotation of said element;
   b. signal generating means connected to said pulse generating means for producing, in response to the occurrence of each pulse, first and second signals each varying with time in a regular, continuous manner until the next pulse occurs whereupon said signals are repeated and again vary in the same manner as before; and
   c. comparison means connected to said signal generating means for providing an indicating signal in response to the occurrence of a predetermined relationship between said first and second signals indicative that rotation of said element has stopped.

2. The combination according to claim 1, further including means connected to said comparison means and to said machine for controlling the operation of said machine in response to said indicating signal.

3. The combination according to claim 1, wherein said element is a cam rigidly secured to the shaft of rotary switching apparatus coupled to the drive of said machine for controlling said machine.

4. The combination according to claim 3, wherein said machine is a power press and said rotary switching apparatus is connected to electrical circuits for controlling the ram clutch and brake of said press.

5. The combination according to claim 4, further including means connected to said comparison means and to said press control circuits for stopping movement of the ram of said press in response to said indicating signal.

6. The combination according to claim 1, wherein said cam has a plurality of lobes or rise portions at equally spaced locations around the periphery thereof.

7. The combination according to claim 1, wherein said first and second signals produced by said signal generating means decrease and increase, respectively, with time in a linear manner toward the same level of magnitude and in a manner whereby said signals do not coincide as long as said pulses continue to appear.

8. The combination according to claim 7, wherein said first and second signals coincide if the next pulse fails to occur at its regular time, the time of coincidence of said signals occuring a short period of time after the time when the leading edge of the next pulse would have been present, said time period being less than the duration of each of said pulses.

* * * * *